United States Patent
Pichler

(10) Patent No.: US 11,472,064 B2
(45) Date of Patent: Oct. 18, 2022

(54) METHOD FOR PRODUCING A POLYCONDENSATE MELT FROM A FIRST PARTIAL MELT STREAM AND A SECOND PARTIAL MELT STREAM, WITH INCREASING OR REDUCING AN INTRINSIC VISCOSITY OF THE SECOND PARTIAL MELT

(71) Applicant: Next Generation Recyclingmaschinen GmbH, Feldkirchen an der Donau (AT)

(72) Inventor: Thomas Pichler, St. Peter am Wimberg (AT)

(73) Assignee: NEXT GENERATION RECYCLINGMASCHINEN GMBH, Feldkirchen an der Donau (AT)

(*) Notice: Subject to any disclaimer, the term of this patent is extended or adjusted under 35 U.S.C. 154(b) by 121 days.

(21) Appl. No.: 17/058,517

(22) PCT Filed: Jul. 2, 2019

(86) PCT No.: PCT/AT2019/060219
§ 371 (c)(1),
(2) Date: Nov. 24, 2020

(87) PCT Pub. No.: WO2020/006591
PCT Pub. Date: Jan. 9, 2020

(65) Prior Publication Data
US 2021/0213645 A1      Jul. 15, 2021

(30) Foreign Application Priority Data
Jul. 3, 2018   (AT) .............................. A 50570/2018

(51) Int. Cl.
*B29B 7/00* (2006.01)
*B29B 7/42* (2006.01)
(Continued)

(52) U.S. Cl.
CPC ............... *B29B 7/007* (2013.01); *B29B 7/42* (2013.01); *B29B 7/726* (2013.01); *B29B 7/749* (2013.01); *C08J 3/005* (2013.01)

(58) Field of Classification Search
CPC ........... B29B 7/007; B29B 7/42; B29B 7/726; B29B 7/749; B29B 7/748; B29B 7/7485;
(Continued)

(56) References Cited

U.S. PATENT DOCUMENTS

| | | |
|---|---|---|
| 3,575,919 A | 4/1971 | Busweiler et al. |
| 3,671,620 A | 6/1972 | Inoue |

(Continued)

FOREIGN PATENT DOCUMENTS

| | | |
|---|---|---|
| CN | 1143090 A | 2/1997 |
| CN | 1194989 A | 10/1998 |

(Continued)

OTHER PUBLICATIONS

"Engineering Plastics" by Jin Guozhen Chemical Industry Press (Jan. 31, 2001); p. 370.
(Continued)

*Primary Examiner* — Charles Cooley
(74) *Attorney, Agent, or Firm* — Collard & Roe, P.C.

(57) ABSTRACT

A method for producing a polycondensate melt from a primary material and a secondary material from materials of substantially the same type is provided. A first partial melt stream of the primary material and a second partial melt stream of the secondary material are provided, and a measured value of the intrinsic viscosity of both partial melt streams is determined, and a difference value is calculated from the measured values. Based on the difference value, the intrinsic viscosity of the second partial melt stream is increased, reduced or maintained unchangedly by using a
(Continued)

first melt treatment device. Subsequently, the two partial melt streams are combined into a common melt stream.

15 Claims, 2 Drawing Sheets

(51) Int. Cl.
  *B29B 7/72* (2006.01)
  *B29B 7/74* (2006.01)
  *C08J 3/00* (2006.01)
(58) Field of Classification Search
  CPC .......... B29B 9/065; B29B 7/845; B29B 7/38; B29B 7/7461; C08J 3/005; C08J 5/18; C08G 63/785
  See application file for complete search history.

(56) References Cited

U.S. PATENT DOCUMENTS

| | | | |
|---|---|---|---|
| 3,714,125 | A | 1/1973 | Shima et al. |
| 5,554,657 | A | 9/1996 | Brownscombe et al. |
| 5,980,790 | A | 11/1999 | Kuwahara et al. |
| 8,202,591 | B2 | 6/2012 | Yokoyama et al. |
| 8,258,239 | B2 | 9/2012 | Fujimaki et al. |
| 8,470,220 | B2 | 6/2013 | Hanimann et al. |
| 9,908,263 | B2 * | 3/2018 | Pichler ................ C08J 11/06 |
| 10,563,036 | B2 | 2/2020 | Gneuss et al. |
| 10,710,036 | B2 * | 7/2020 | Behoun ............... C08G 64/025 |
| 2005/0062186 | A1 * | 3/2005 | Fellinger ............. B29B 13/021 264/102 |
| 2007/0265382 | A1 | 11/2007 | Yamamoto |
| 2013/0211037 | A1 | 8/2013 | Maeda et al. |
| 2015/0266209 | A1 * | 9/2015 | Pichler ................ B29C 48/64 425/71 |
| 2016/0243744 | A1 | 8/2016 | Gneuss et al. |
| 2017/0312971 | A1 | 11/2017 | Terpsma et al. |
| 2018/0111101 | A1 * | 4/2018 | Behoun ............... C08G 69/04 |
| 2021/0213645 | A1 * | 7/2021 | Pichler ................ B29B 7/726 |

FOREIGN PATENT DOCUMENTS

| | | | |
|---|---|---|---|
| CN | 1391597 A | 1/2003 | |
| CN | 101068848 A | 11/2007 | |
| CN | 101796096 A | 8/2010 | |
| CN | 104532366 A | 4/2015 | |
| CN | 104936760 A | 9/2015 | |
| CN | 105754139 A | 7/2016 | |
| CN | 106279658 A | 1/2017 | |
| CN | 106279755 A | 1/2017 | |
| CN | 107107437 A | 8/2017 | |
| DE | 1 924 691 A1 | 4/1970 | |
| DE | 199 44 709 A1 | 4/2000 | |
| DE | 10 2006 023 354 A1 | 11/2007 | |
| DE | 20 2016 101 935 U1 | 4/2016 | |
| DE | 10 2015 226 043 A1 | 6/2017 | |
| EP | 1 222 231 B1 | 1/2005 | |
| EP | 1 084 171 B1 | 11/2005 | |
| EP | 2 748 358 B1 | 3/2015 | |
| EP | 2 021 116 B2 | 2/2017 | |
| EP | 3 274 148 B1 | 1/2019 | |
| GB | 1103123 A | 2/1968 | |
| JP | 2002200432 A | 7/2002 | |
| WO | 00/77071 A1 | 12/2000 | |
| WO | WO-2006007966 A1 * | 1/2006 | ............. B01J 19/18 |
| WO | 2006/060930 A1 | 6/2006 | |
| WO | 2011/161467 A1 | 12/2011 | |
| WO | 2014/040099 A1 | 3/2014 | |
| WO | WO-2020006591 A1 * | 1/2020 | ............. B29B 7/007 |

OTHER PUBLICATIONS

International Search Report in PCT/AT2019/060219, dated Nov. 8, 2019.
Neue Verfahrensmethoden, innovative Technologie und gewinnbringende Services, Apr. 18, 2018, Gepostet In: Inside NGR, Product Announcements. [https://www.ngr-world.com/de/ngr-highlights-npe-2018/Download: Apr. 29, 2019]. with Machine translation.

* cited by examiner

Fig.2

METHOD FOR PRODUCING A POLYCONDENSATE MELT FROM A FIRST PARTIAL MELT STREAM AND A SECOND PARTIAL MELT STREAM, WITH INCREASING OR REDUCING AN INTRINSIC VISCOSITY OF THE SECOND PARTIAL MELT

CROSS REFERENCE TO RELATED APPLICATIONS

This application is the National Stage of PCT/AT2019/060219 filed on Jul. 2, 2019, which claims priority under 35 U.S.C. § 119 of Austrian Application No. A 50570/2018 filed on Jul. 3, 2018, the disclosure of which is incorporated by reference. The international application under PCT article 21(2) was not published in English.

BACKGROUND OF THE INVENTION

1. Field of the Invention

The invention relates to a method for producing a polycondensate melt from a primary material and a secondary material from materials of substantially the same type.

2. Description of the Related Art

EP 2 021 116 B2 describes a method and a device for producing a mold body from a mixture of old polyester and fresh polyester comprising the following steps:
a) melting the washed old polyester in a melting device,
b) adding diol to the melt of old polyester in or after the melting device,
c) mixing the melt of old polyester with the melt of fresh polyester from a melting reactor,
d) polycondensating the melted mixture in a high-viscosity melting reactor under reduced pressure,
e) granulating the polyester melt in an underwater granulator at a water temperature between 90 and 99° C.,
f) separating the water from the granules, cooling down the granules as little as possible,
g) transferring the low-water granules obtained this way after the water removal, either directly or by means of a dosing organ, particularly preferably by means of a cell wheel lock, into a dealdehydization container,
h) treating the granules in the dealdehydization container by means of a scavenging air stream.

A disadvantage of this method is that, by adding diol to the melt of old polyester, the intrinsic viscosity is continually reduced, and an internal degradation of the melt is associated. The additive diol is then to be removed from the melt in the subsequent polycondensation process for increasing the intrinsic viscosity. While the value of the intrinsic viscosity can be increased by the subsequent polycondensation process, this requires high temperatures and, above all, a higher capacity of the vacuum system, which leads to a worse energy balance. It is always partial melt streams having intrinsic viscosities that are different from one another that are combined and then are together fed to a DHI reactor for further processing.

Furthermore, an advantage of the known methods is that the primary melt and the secondary melt always have different I.V. values. Therefore, on the one hand, a mixing on a macroscopic level is necessary for the end product. On the other hand, it is to be noted that even on a microscopic level, i.e. even when there is a sufficient homogenization, the I.V. value itself only represents an averaged quantity on the underlying molar mass distribution. There are quantitative correlations between different parameters of the molar mass distribution and the I.V. value. In the relevant literature, it is related to the so-called viscosity average, which lies approximately in the region of the so-called mass average molecular weight of the molecular weight distribution.

Furthermore, empirical, polymer specific relations between the maximum of the molar mass distribution and the I.V. value can be found. However, the I.V. value does not give any information on the width or generally the shape of the distribution. The mere mixing of two monomodal melts with different I.V. first leads to a bimodal molar mass distribution having two maxima, which correspond with the different I.V. values of the primary and secondary melt. Only by prolonged mixing and transesterification reactions (in the case of polyesters) or transamidation reactions (in the case of polyamides), the two maxima approach one another and eventually yield a molar mass distribution having only one maximum, which, however has a greater width that the two individual streams and/or partial melt streams. The measurement of the I.V. does not illustrate this process as only one value at a time is determined instead of a distribution curve.

As long as the melt is additionally also not well-mixed yet on a macroscopic level, meaning individual regions of pure primary melt or secondary melt are still identifiable, multiple I.V. measurements merely yield a greater dispersion depending on the location of the sampling.

The determination of the molar mass distribution is typically carried out via so-called gel permeation chromatography (GPC). It provides a frequency distribution of polymer chains of different lengths and/or molar mass. Three average values serve for the characterization:
the number average $M_n$ (number average molecular weight),
the weight average $M_w$ (mass average molecular weight), and
the so-called Z average molecular weight.

The width of the distribution is usually given as the relation of the weight average to the number average $M_w/M_n$, the so-called polydispersity index (PDI).

The object of the present invention is to overcome the disadvantages of the prior art and to provide a method, by means of which a polycondensation material to be recycled can be mixed, as a processed secondary melt, into a polycondensation primary melt while avoiding as best as possible a conscious degradation, without changing the intrinsic viscosity of the material and obtaining a homogeneous molecular weight distribution in the overall melt.

SUMMARY OF THE INVENTION

This object is achieved by means of a method according to the claims.

The method serves for producing a polycondensate melt from a primary material and a secondary material from materials of substantially the same type and of the same chemical basic composition, comprising following steps:
providing a first partial melt stream "I" of the primary material, which primary mate-rial has been synthesized from at least one monomer,
determining a first measured value of the intrinsic viscosity of the first partial melt stream "I" of the primary material, providing a second partial melt stream "II" of the secondary material, which secondary material is formed of a polycondensate material that has already been processed at least once, determining a second measured value of the intrinsic viscosity of the second partial melt stream "II" of the secondary material, forming a difference value from the first measured value of the intrinsic viscosity of the primary material and the second measured value of the intrinsic viscosity of the secondary material, increasing or reducing the intrinsic viscosity of the second partial melt stream "II" of the secondary material to the determined first measured value of the intrinsic viscosity of the first partial melt stream "I" of the primary material by means of a first melt treatment device, on the basis of the determined difference value, or unchangedly maintaining the intrinsic viscosity of the second partial melt stream "II" of the secondary material based on the determined difference value, subsequent formation of a common melt stream of the polycondensate from the second partial melt stream "II" of the secondary material, in which the quality defined by the intrinsic viscosity has been aligned with the quality of the first partial melt stream "I" or already has said quality, by combining and uniting it with the first partial melt stream "I" of the primary material.

In this approach, it is advantageous that a first partial melt stream of a partial melt stream is produced in a known manner, and that it remains essentially unchanged until being mixed into the second partial melt stream of the processed secondary material. In order to feed plastic waste accumulating in increasingly large quantities to recycling, a second partial melt stream of a secondary material formed of a material that of essentially the same type is provided and combined with the first partial melt stream so as to form a common melt stream. Before combining and uniting the two partial melt streams, it is provided here that the quality, which is defined by the intrinsic viscosity here, of the second partial melt stream of the secondary material has been aligned with the quality of the first partial melt stream or already has that quality. Therefore, the molar mass distributions of the two partial melt streams are very similar and particularly have a maximum at the same molar mass. The resulting molar mass distribution thus results, in a time-consistent manner from the addition of the two individual distributions while the maximum of the curve remains unchanged, and it requires no further dwell time.

In order to always be able to carry out this exact processing and alignment of the quality of the second partial melt stream to the quality of the first partial melt stream, the quality of the first partial melt stream is assessed by determining a first measured value of the intrinsic viscosity. This first measured value serves as a reference value for building and aligning the quality of the processed, second partial melt stream of the secondary material. Before uniting the two partial melt streams, a second measured value of the intrinsic viscosity of the second partial melt stream of the secondary material is also determined. With the aid of an evaluation and comparison process, the two determined measured values, namely the first measured value of the first partial melt stream and the second measured value of the second partial melt stream, are put into a connection or relation to one another. Depending on the evaluation result of the first and second measured values put in relation to one another, either an intervention into the treatment conditions is carried out or the treatment conditions are maintained unchangedly. This ensures that only partial melt streams with equal quality relative to one another are combined to form a common melt stream.

Moreover, an approach is advantageous, in which the common melt stream of the polycondensate melt formed of the two partial melt streams "I+II" is mixed by means of a mixing device. The additional mixing of the two partial melt streams allows providing or forming an even more homogeneous and consistent melt.

A further advantageous approach is characterized in that the common melt stream of the polycondensate melt is immediately fed to a shaping unit arranged downstream. By immediately feeding the common melt stream to a directly adjacent shaping unit, energy can be saved, which would otherwise have to be supplied when cooling and subsequently heating the material again.

A method variant, in which the common melt stream of the polycondensate melt is granulated, is also advantageous. Independently of this, however, it is also possible to form plastic granules from the common melt stream, which granules can be fed to subsequent further processing.

Another approach is characterized in that, for creating the second partial melt stream "II" of the secondary material, a provided polycondensate material, which has already been processed at least once, is comminuted, possibly cleaned, and in a melting device, the second partial melt stream "II" of the secondary material is formed. Hence, the second melt stream provided for subsequent treatment can be formed by the plastic material provided for recycling.

Moreover, an approach is advantageous, in which, after melting the polycondensate material that has already been processed at least once and before feeding the same into the first melt treatment device, a third measured value of the intrinsic viscosity of the second partial melt stream "II" of the secondary material is determined. Hence, even before the second partial melt stream to be treated enters, the treatment and thus the treatment conditions in the first melt treatment device can already be aligned and adjusted, so that the quality predetermined on the basis of the first measured value can be ensured. As a result, an even better alignment and a quicker consideration of the changing qualities of the melt fed to the treatment device can be carried out.

Another approach is characterized in that the second partial melt stream "II" of the first melt treatment device is fed to a chamber in a head region distanced from a contact surface, in which chamber a pressure is lower than 20 mbar, the second partial melt stream "II" is divided into thin melt threads by means of a perforated plate having a plurality of openings, that the melt threads pass the chamber in a free fall in the direction toward the contact surface, the melt threads are combined into a melt bath in a collection container below the chamber, wherein the collection container is arranged so as to immediately link laterally to the chamber, and a pressure in the collection container is also lower than 20 mbar, the melt constituting the melt bath in the collection container is mixed by a, preferably helical, mixing and discharge part oriented in a horizontal position, a height of the melt bath in the collection container is selected at such a height that the mixing and discharge part in the collection container is not entirely covered by the melt, and thus, the surface of the melt is repeatedly torn open and renewed multiple times due to a rotational movement of the mixing and discharge part, and in the course of this, the reduced pressure acts on the melt bath, the polycondensation, which started at the thin melt threads, is continued by the remaining and keeping in motion, and hence, the polymer chain growth and with that, a further increase of the intrinsic viscosity is effected, and in that the treated melt is discharged from the collection container as the second, treated partial melt stream "II".

Hence, a first treatment stage of the melt to be treated can be created already by dividing the second melt stream into thin melt threads and them freely falling in the direction toward the contact surface. An additional, further increase in the quality of the melt can be carried out in the melt bath located below the falling chamber, by means of the mixing and discharge part and by tearing open the surface of the melt and by means of the selected vacuum. This way, an additional polycondensation process of the melt to be treated can be achieved.

A further advantageous approach is characterized in that the duration of the treatment of the second partial melt stream "II" in the first melt treatment device and/or the pressure present in the chamber of the first melt treatment device and/or the temperature in the chamber of the first melt treatment device are determined based on the determined third measured value of the intrinsic viscosity of the second partial melt stream "II" of the secondary material and the determined first measured value of the intrinsic viscosity of the primary material, and the treatment and therefore the alignment of the intrinsic viscosity is carried out. As a result, parameters for the different treatment processes can be set already beforehand, depending on the determined third measured value and the associated quality of the partial melt stream fed to the first treatment device, such that a consistent quality of the melt of the second partial melt stream can be provided A method variant, in which a third partial melt stream "III" is removed or diverted from the common melt stream of the polycondensate melt, and the third partial melt stream "III" is fed to a further treatment device, is also advantageous. This creates the possibility to remove or divert a partial quantity of the melt from the common melt stream for a partial application, and to be able to align it, in a separate further treatment device, with the quality required therefor, independently of the common melt stream.

Moreover, an approach is advantageous, in which a treatment device like the first is used as the further treatment device. This allows for the third partial melt stream to also be fed to a proper treatment with a treatment device having the same effect.

A further advantageous approach is characterized in that a target value of the intrinsic viscosity is stored in a control unit as a reference value. This predetermines a target value for the entire installation for the quality to be produced of the polycondensate melt. This way, the method sequence of the installation can be adapted to different products to be produced as required.

A method variant, in which, based on the determined first measured value of the intrinsic viscosity of the first partial melt stream "I" of the primary material, the intrinsic viscosity of the first partial melt stream "I" is aligned with the predetermined target value of the intrinsic viscosity of the polycondensate melt to be produced, is also advantageous. This makes it possible to recognize a deviation of the quality of the produced first partial melt stream from the predetermined target value and to quickly react to it. However, it is always ensured that the two partial melt streams have the same quality relative to one another before combining or uniting them. Lastly, another approach is characterized in that the alignment of the intrinsic viscosity of the first partial melt stream "I" of the primary material with the predetermined target value of the intrinsic viscosity of the polycondensate melt is carried out by means of a second melt treatment device, in particular a high-viscosity disc reactor. This allows to align and/or always maintain the quality of the first partial melt stream in a known manner.

BRIEF DESCRIPTION OF THE DRAWINGS

For the purpose of better understanding of the invention, it will be elucidated in more detail by means of the figures below.

This shows, in a very simplified schematic representation:

FIG. 2 shows, in a diagram, the molar mass distribution of the melt of the primary material, the melt of the secondary material before adapting its quality, the melt of the secondary material after adapting its quality, and the combined polycondensate melt.

DETAILED DESCRIPTION OF THE PREFERRED EMBODIMENTS

Figure 1:
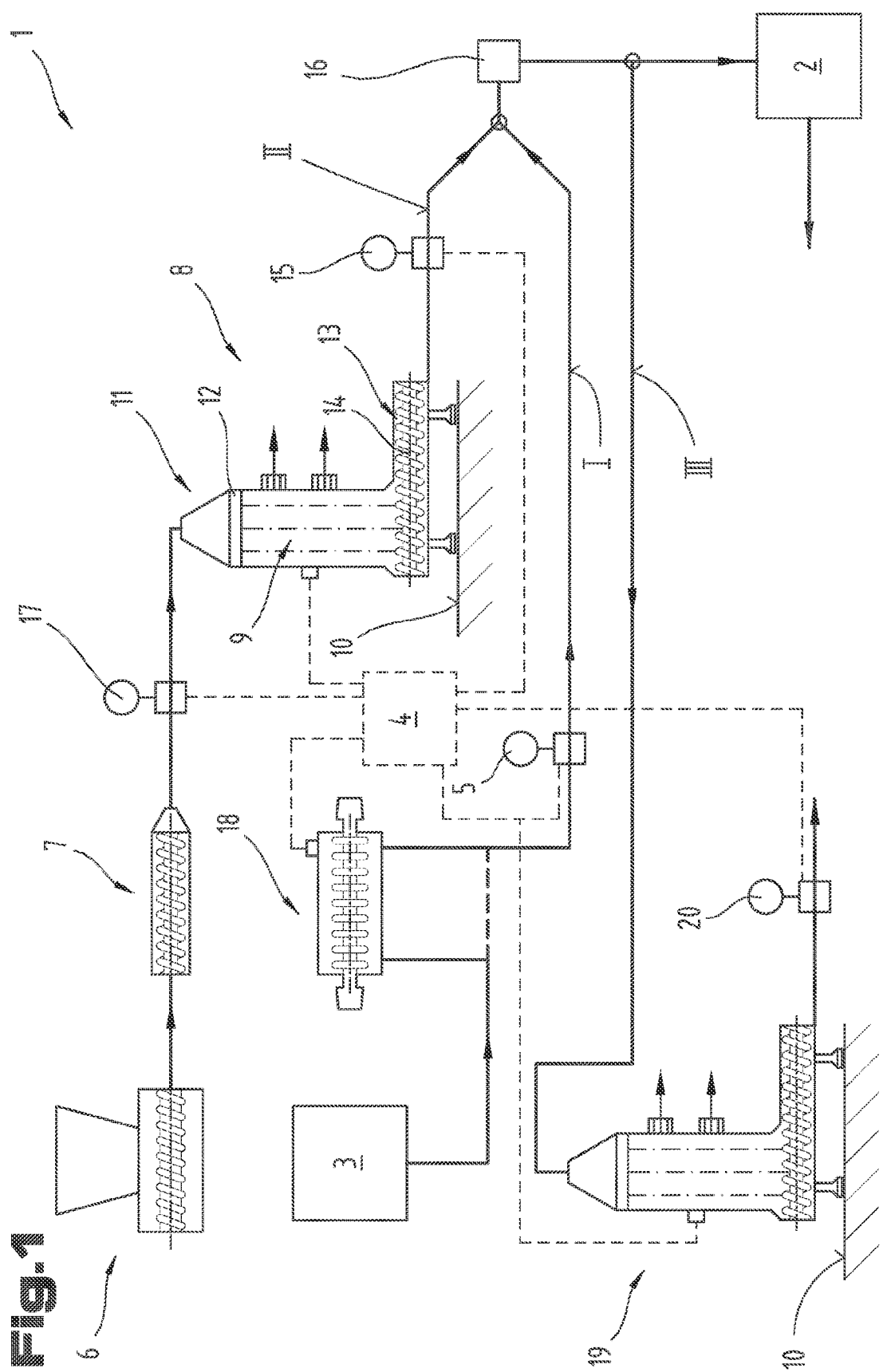
FIG. 1 a schematic depiction of an installation for producing and treating a polycondensate melt from a primary material and a secondary material from materials of substantially the same type.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

The term "in particular" shall henceforth be understood to mean that it may refer to a possible more specific formation or more detailed specification of an object or a process step, but need not necessarily depict a mandatory, preferred embodiment of same or a mandatory practice.

In the following, reference is made to the viscosimetry, wherein this describes the measurement of the viscosity of liquids, fluid substances or gases. The viscosity is determined in a measurement instrument, the viscometer, by measuring the flow time and/or the flow speed of the liquid or the gas through a defined volume for a defined amount, usually in a capillary. In doing so, the load is kept constant by a weight and/or the fluid freely flows out under its own weight. Alternatively, the volume passage can be kept constant e.g. by a melt pump instead, and the pressure loss is measured via a capillary by means of two pressure sensors.

The volumetric flow rate (or, less precise, the flow rate) is a physical quantity in the field of fluid mechanics. It specifies how much volume of a medium per time span is transported through a defined cross-section. The Staudinger index, named after Hermann Staudinger and often also referred to as limiting viscosity number or intrinsic viscosity [I.V.], is obtained by extrapolation of the concentration "c" of a diluted solution to zero. The intrinsic viscosity—I.V.—has the unit [dl/g] and is therefore a specific volume which expresses the ratio of hydrodynamic volume to molar mass.

For purposes of consistency, the term intrinsic viscosity [I.V.] is used here. "Determining" a measured value of the intrinsic viscosity [I.V.] of the melt or of its partial melt streams is understood to be the process of measuring the viscosity and the subsequent identification of the intrinsic viscosity [I.V.].

FIG. 1 shows, in a highly simplified installation model, an installation 1 for performing the method, in particular for producing a polycondensate melt of a primary material and for treating a polycondensate melt of a secondary material. In this method, the polycondensate melt is always formed of materials which are of substantially the same type of the primary material and the secondary material to be recycled, which is separately treated. Low quantities of aggregates such as colors, stabilizers, catalysts, nucleating agents or processing aids may be contained in the respective base material or may be added to it or have been added to it, which is why they are designated as being of substantially the same type.

Materials to be used for composing the polycondensate melt can be e.g. polyethylene terephthalate (PET), polytrimethylene terephthalate (PTT), polybutylene terephthalate (PBT), polyethylene naphthalate (PEN), polyethylene 2,5-furandicarboxylate (PEF) or polyamides, and they can be produced and treated in the course of the production process. However, in this regard, the partial melt streams are to be of substantially the same type, meaning of the same chemical basic composition. Polyesters are often dosed with small amounts or a small proportion (of a few percent) of co-monomers, in order to obtain certain mechanical or thermal properties, such as a slowed crystallization or something similar. The range of the I.V. is not substantially changed by this, so that an adjustment of the molar mass distribution is possible via adapting the I.V. value. In case of a fundamental difference of the monomers, however, other numerical relations between the different viscosity measurements apply, so that an adaption of the melt quality according to the present invention is no longer possible.

This analogously applies to various polyamides which are based on monomers of different chain lengths.

Further designation or naming of connection lines or conveyor lines have been dispensed with in the installation model, wherein they are adumbrated in a simplified manner in the form of lines. Installation components are preferably depicted in a simplified manner as boxes or as symbols.

The combined polycondensate melt can, after its production process, e.g. be fed directly and immediately to a shaping unit 2 and be further processed into a product there. Thus, it is possible to produce, directly following, e.g. threads, bottles, preforms or films can be made using the polycondensate melt. This allows to avoid a cooling process and a subsequent heating process. Moreover, however, a degradation of the material properties can be prevented. Independently, a cooling and subsequent granulation of the polycondensate melt would also be conceivable.

A fresh polyester melt of the primary material is produced in a known, conventional manner in a usually multi-stage polycondensation unit 3 having an I.V. of 0.40 to 0.90 dl/g. The primary material is synthesized from at least one monomer or multiple monomers, and thus, a first partial melt stream "I" is provided. The first partial melt stream "I" is labeled with an "I" by the conveyor line leading away from the polycondensation unit 3.

The quality of the primary material, which is defined by the intrinsic viscosity [I.V.] here, is defined depending on requirements and the product to be produced, and the material is to be provided in a constant quantity. This target value of the intrinsic viscosity of the polycondensate melt may be stored or may have been stored in a control unit 4 as a reference value. The control unit 4 does not only evaluate measuring results but can also be communication-connected to different installation components in order to control them. For this, the possibilities known from the prior art, such as wireless and/or wire-bound connections, may be used.

In order to monitor the I.V. of the first partial melt stream "I" of the primary material, a first measuring device 5 is provided, which is configured as a viscometer, for example. The first value measured by the first measuring device 5 can be transmitted to the control unit 4, in which the I.V. can then be determined. Thus, a determination of the first measured value of the intrinsic viscosity of the first partial melt stream "I" of the primary material takes place and with that, a quality check. Here, the quality of the polycondensate melt is expressed by means of the intrinsic viscosity, for which the target value can be defined and specified. However, other parameters or another determination of other measured values may also be used for this.

Should the determined first measured value of the I.V. not correspond with the target value of the I.V., the I.V. is to be aligned, in a known manner, with the defined target value of the I.V. of the polycondensate melt in the polycondensation unit 3.

In order to feed plastic waste accumulating in increasingly large quantities to recycling, in particular recycling of only one type of material, it is provided here that a second partial melt stream "II" of the secondary material, made up of a material of the same type as the first partial melt stream "I", is provided. Secondary material is understood to be a material that is formed of a polycondensate material which has already been processed once. In a depicted conveyor line, the second partial melt stream "II" is marked with a "II".

The processing and providing of the second partial melt stream "II" of the secondary material can be carried out such that the polycondensate material that has already been processed once is collected, comminuted in a comminuting device 6 and melted in a melting device 7. If necessary, a cleaning process, such as a washing process, may be carried out before and/or after the comminuting step. It is also possible to filter the melt of the secondary material after the melting process, as it is sufficiently known.

The second partial melt stream "II" of the secondary material provided this way is then fed to a first melt treatment device 8 for processing, cleaning and treatment. In said first melt treatment device 8, the alignment of the I.V. with the determined first measured value of the I.V. of the first partial melt stream "I" of the primary material takes place. The first partial melt stream "I" of the primary material should already have an I.V., which is aligned with the defined and predetermined target value of the I.V. of the polycondensate melt to be produced and thus, substantially corresponds with said target value. Usually, the I.V. is increased or raised over the course of a polycondensation process. Moreover, a cleaning process of the melted secondary material and with that, a removal of volatile organic compounds, impurities, aggregates etc. can be carried out in the first melt treatment device 8.

For this purpose, the first melt treatment device 8 comprises a chamber 9, which has a vertical longitudinal and/or height extension, for forming a drop tower. The first melt treatment device 8 is supported and/or is mounted on a mostly flat contact surface 10. The chamber 9 is designed to be fundamentally sealed off with respect the outer surrounding, and its interior can be lowered, by means of a vacuum device which is not further depicted, to a pressure that is reduced with respect to the atmospheric pressure. In this process, the pressure in the chamber 9 is preferably lowered and/or evacuated to a pressure of less than 20 mbar, in particular between 0.5 mbar and 5 mbar.

The second partial melt stream "II" melted by the melting device 7 is fed to the chamber 9, into its upper head region 11. The head region 11 is the part of the chamber 9 which is arranged at the furthest distance from the contact surface 10. Moreover, a perforated plate 12 or a screen having a plurality of openings is accommodated or arranged inside the chamber 9 and in its head region 11. The second partial melt stream "II" is divided into a plurality of thin melt threads, shown as thin lines, by means of the perforated plate 12 and the passages or channels located therein. The melt threads pass the chamber 9 in a free fall and fall or flow down in the direction toward the contact surface 10.

A collection container 13 is arranged below the chamber 9, linking directly and laterally thereto, inside of which collection container the melt threads are combined into a melt bath. In the collection container 13, the pressure is also below 20 mbar, namely preferably the same pressure as in the chamber 9, as the collection container 13 and the chamber 9 are arranged without a dividing wall relative to one another and have an immediate flow connection.

In the collection container 13, a mixing and discharge part 14 is accommodated, which is oriented in the parallel direction with respect to the longitudinal extension of the collection container 13. This is preferably oriented in a horizontal position and therefore also in parallel to the also usually horizontal contact surface 10. The mixing and discharge part 14 can have a helical design. The melt bath of the second partial melt stream "II" is constantly moved and mixed by the mixing and discharge part 14 set into a rotary motion.

A height of the melt bath in the collection container 13 is selected at such a height that the mixing and discharge part 14 in the collection container 13 is not entirely covered by the melt. Due to the clearance located above the melt level, the surface of the melt can be repeatedly torn open and renewed multiple times due to the rotational movement of the mixing and discharge part 14. In this process, a reduced pressure is acting on the melt bath. The melt treatment device 8 can also be insulated and/or its interior may be heated against an inadvertent cooling of the melt to be treated therein.

Due to the falling movement of the melt threads in the chamber 9, the temperature and the reduced pressure in the chamber 9, the polycondensation of the melt and/or the melt threads begins. Likewise, impurities or inclusions still contained can be removed from the melt and/or the melt threads and be vacuumed off by means of the vacuum device for building the reduced pressure. The polycondensation which started with the thin melt threads is continued in the melt bath by remaining and keeping in motion. This leads to the polymer chain growth and, associated therewith, a further increase of the intrinsic viscosity. During polycondensation, at least one byproduct is released. These byproducts, such as water, ammonia, low alcohols, glycols, have to be continually discharged, as otherwise, the polycondensation stops. After the melt of the second partial melt stream "II" has been treated, it is discharged and/or removed from the collection container 13 as a second, treated partial melt stream "II".

By means of a second measuring device 15, which may also be configured e.g. as a viscometer, the viscosity of said second, already treated partial melt stream "II" can be measured. The second value measured by the second measuring device 15 can also be transmitted to the control unit 4, in which the I.V. can then be determined. Thus, a determination of a second measured value of the intrinsic viscosity of the second partial melt stream "II" of the secondary material takes place and with that, a quality check. Additionally, a further arrangement of at least individual installation components in parallel to the previously described arrangement of the comminuting device 6, the melting device 7 and the first melt treatment device 8 could be carried out for increasing the mass of the secondary material. This way, a further second partial melt stream "Ii-a" of the secondary material could be provided.

In order to obtain the same or approximately the same quality in both partial melt streams "I+II", so that they can subsequently be united or combined into a common melt stream, an alignment of the I.V. of the second partial melt stream "II" with the first partial melt stream "I" is to be carried out, wherein the first partial melt stream "I" is to already have a defined or pre-determined I.V.

A difference value or comparative value is calculated from the first measured value of the I.V. of the primary material and the second measured value of the I.V. of the secondary material, or the measured values are put into a different relation to one another. Based on the determined or calculated difference value, the treatment conditions in the first melt treatment device 8 are adapted to said difference value, so that an increase or a reduction of the I.V. of the melt of the second partial melt stream "II" takes place. Should the quality and with it, the I.V. of the second partial melt stream "II" correspond with the quality and with it, the I.V. of the first partial melt stream "I", it is not necessary to change or adapt the treatment conditions in the first melt treatment device 8.

The adaption of the treatment conditions and associated with this, the treatment result to be achieved, can be carried out by means of the dwell time and/or the temperature and/or the existing pressure. By means of this control loop, the I.V. of the second partial melt stream "II" of the secondary material is brought to the determined first measured value of the I.V. of the primary material, which should, in particular, correspond with the defined target value of the I.V. of the polycondensate melt. Should minor deviations of the I.V. of the first partial melt stream "I" from the target value of the I.V. of the polycondensate melt occur, the second partial melt stream "II" of the secondary material is adapted to this I.V., as well. This serves to achieve that both partial melt streams "I+II" always have about the same or almost the same I.V. Should, however, a deviation of the I.V. of the first partial melt stream "I" from the target value of the I.V. of the polycondensate melt to be produced be determined, the I.V. is to be adapted to the target value in the known manner.

When the two partial melt streams are each provided individually, they are combined or united into the common melt stream of the polycondensate melt.

Moreover, it is also possible that the common melt stream of the polycondensate melt formed of the two partial melt streams is mixed by means of a mixing device 16. The combine common melt stream or the additionally mixed melt stream of the polycondensate melt can be fed to the shaping unit 2 and be shaped into the desired semi-finished product or finished product by means of said shaping unit.

Additionally, it could be provided that the viscosity is measured after melting the polycondensate material which has already been processed at least once and before feeding the same into the first melt treatment device 8 by means of a third measuring device 17, which may also be configured e.g. as a viscometer. The third value measured by the third measuring device 17 can also be transmitted to the control unit 4, in which the I.V. can then be determined. Thus, a determination of a third measured value of the intrinsic viscosity of the second partial melt stream "II" of the secondary material takes place, even before entering the first melt treatment device 8.

Based on the determined third measured value of the I.V., the treatment conditions, namely the treatment duration of the second partial melt stream "II" in the first melt treatment device 8 and/or the pressure in the chamber 9 of the first melt treatment device 8 can be influenced. The influence can be effected by the control unit 4, and the parameters and/or machine settings of the first melt treatment device 8 can be adapted. Adapting and/or changing the machine settings of the first melt treatment device 8 are/is based on the determined third measured value of the I.V. of the second partial melt stream "II" of the secondary material and the determined first measured value of the I.V. of the primary material. The first partial melt stream "I" of the primary material should preferably have an I.V. which corresponds with the predetermined target value. With the aid of the changed or adapted treatment of the second partial melt stream "II", the alignment of the I.V. can be carried out.

The first partial melt stream "I" of the primary material produced in the polycondensation unit 3 can be fed to a second melt treatment device 18 for aligning or raising its I.V. to the defined target value of the I.V. of the polycondensate melt. This can particularly be formed by a high-viscosity disc reactor as it is sufficiently known and has been depicted in a simplified manner. In this manner, the I.V. value can be raised or improved to up to 1.2 dl/g.

It would also be possible to remove or divert a third partial melt stream "III", marked with a "III" in a conveyor line, from the common melt stream of the polycondensate melt. The third partial melt stream "III" can be fed to a further melt treatment device 19. In said further melt treatment device 19, the removed partial quantity can be further treated and influenced. This way, the I.V. of the third partial melt stream "III" could be increased even further with respect to the I.V. of the common melt stream. The further melt treatment device 19 can have the same method of operation as the first melt treatment device 8. In particular, a melt treatment device like the first melt treatment device 8 is used as the further melt treatment device 19. In order to avoid unnecessary repetitions, it is pointed to and reference is made to the detailed description of the first melt treatment device 8.

After the passage and treatment of the third partial melt stream "III" through the further melt treatment device 19, the viscosity and subsequently the quality of the third, treated partial melt stream "III" could be determined by a fourth measuring device 20. The fourth measuring device 20 can also be configured as e.g. a viscometer for measuring the viscosity. The fourth value measured by the fourth measuring device 20 can also be transmitted to the control unit 4, in which the I.V. of the third, treated partial melt stream "III" can then be determined.

The proportion of the melt of the second partial melt stream "II" of the secondary material with respect to the entirety of the polycondensate melt can be between a few % (e.g. 1%, 5% or 10%) to up to 99%. The proportion and/or the entirety can relate to the mass [wt. %] or the volume [Vol. %] or the volumetric flow rate per time unit.

Figure 2:
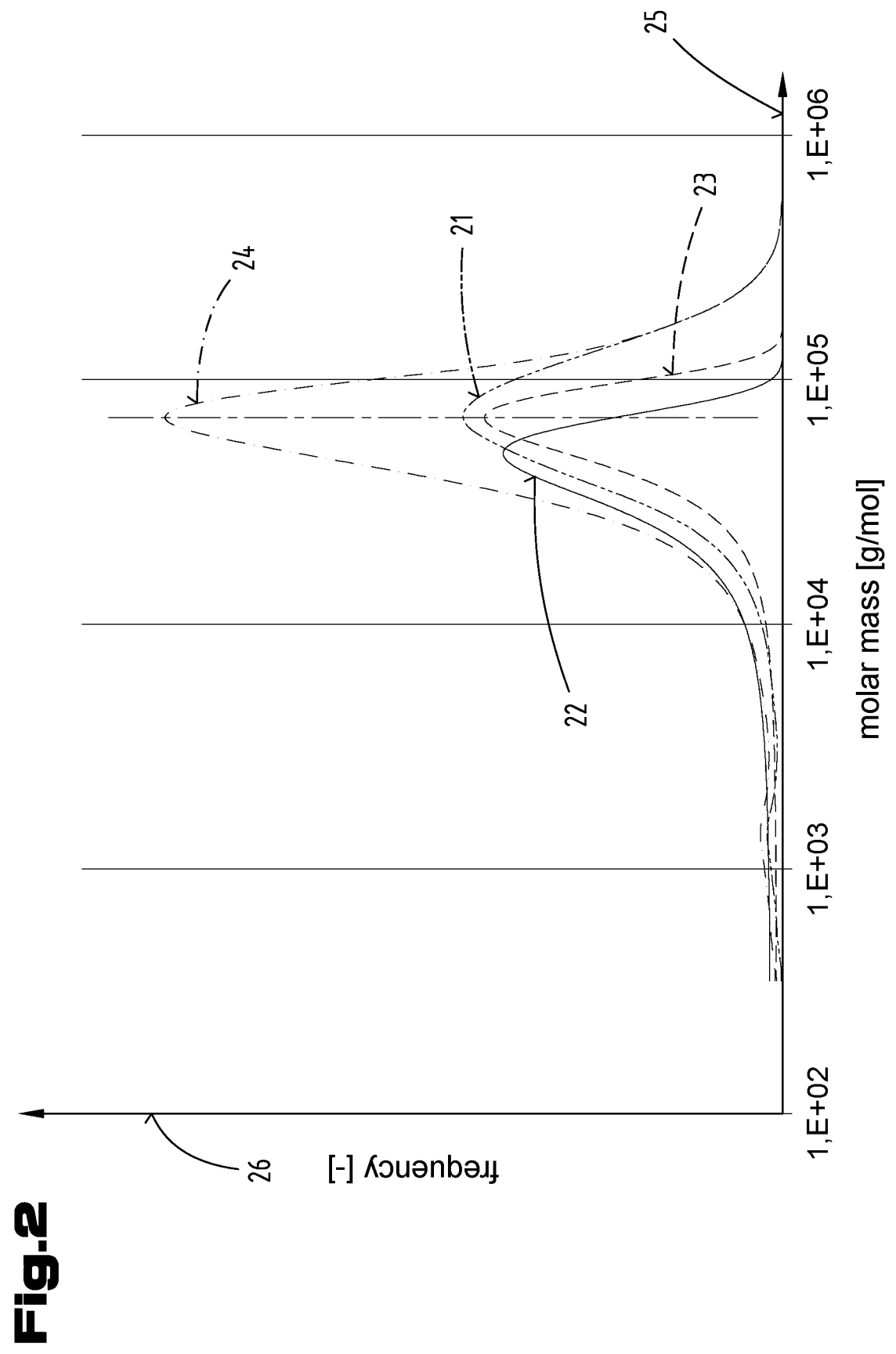

By way of example, FIG. 2 shows, in a line diagram, the distribution of the molar mass and/or the molar mass distributions of the individual partial melt streams and of the common melt stream of the polycondensate melt combined and united of the two partial melt streams "I" and "II".

The first diagram line 21 shows the molar mass distribution of the partial melt stream "I" of the primary material produced in the polycondensation unit 3, and is represented by a line made up of a sequence of a dash and two dots. The second diagram line 22 depicted shows the molar mass distribution of the melt of the secondary material provided by the melting device 7 before entering the first melt treatment device 8. A third diagram line 23, represented by a dashed line, shows the molar mass distribution of the treated melt of the secondary material which has been discharged from the first melt treatment device 8. The first partial melt stream "I" of the primary material can also be treated by means of the second melt treatment device 18, and thus the I.V. can be adapted, in particular increased and/or improved, to the defined target value of the I.V. of the polycondensate melt.

Lastly, a fourth diagram line 24 shows the molar mass distribution of the common melt stream of the polycondensate melt combined and united of the two partial melt streams "I" and "II". The fourth diagram line 24 is represented by a dot-dashed line.

The molar mass, which is also referred to as molecular weight, is plotted in [g/mol] on an abscissa 25 of the line diagram. In chemistry, it is common to use a specification for the molar mass differing from the SI unit [kg/mol]. The frequency of a molecule with the respective molar mass is plotted on an ordinate 26. The specification on the abscissa 25 with 1,E+02 corresponds with a value of 100, and the specification 1,E+06 corresponds with a value of 1,000,000.

Before entering the first melt treatment device 8, the melt of the secondary material provided by the melting device 7 generally has a lower I.V. than the first partial melt stream "I" of the primary material produced in the polycondensation unit 3 and possibly treated in the second melt treatment device 18.

Upon entering the first melt treatment device 8, the melt of the secondary material has a lower I.V. than the melt of the primary material. That is why the maximum of the molar mass distribution is lower, as it is shown in the second diagram line 22. In the first melt treatment device 8, the curve is moved up to higher molar masses such that its maximum matches that of the melt of the primary material. This can be seen in a combination of the first diagram line 21 and the third diagram line 23. Combining the partial melt streams "I" and "II" leads to a combined molar mass distribution whose maximum is still unchangedly located at the same molar mass. This is shown by the fourth diagram line 24. Thus, without further mixing of the two partial melt streams "I" and "II", a more homogenous melt can be created than it would be possible using the method according to the current prior art. This has a positive influence on numerous physical and mechanical properties of the plastic material and the plastic objects subsequently produced with it.

Lastly, it is noted that the individual method steps and their chronological sequence do not obligatorily have to be carried out in the stated order, but a chronological order differing from this is also possible.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS 1 plant
2 shaping unit
3 polycondensation unit
4 control unit
5 first measuring device
6 comminuting device
7 melting device
8 first melt treatment device
9 chamber
10 support surface
11 head region
12 perforated plate
13 collection container
14 mixing and discharge part
15 second measuring device
16 mixing device
17 third measuring device
18 second melt treatment device
19 further melt treatment device
20 fourth measuring device
21 first diagram line
22 second diagram line
23 third diagram line
24 fourth diagram line
25 abscissa
26 ordinate
I first partial melt stream
II second partial melt stream
III third partial melt stream

The invention claimed is:

1. A method for producing a polycondensate melt from a primary material and a secondary material from materials of substantially the same type and of the same chemical basic composition, comprising following steps:
   providing a first partial melt stream (I) of the primary material, which primary material has been synthesized from at least one monomer,
   determining a first measured value of the intrinsic viscosity of the first partial melt stream (I) of the primary material,
   providing a second partial melt stream (II) of the secondary material, which secondary material is formed of a polycondensate material that has already been processed at least once,
   determining a second measured value of the intrinsic viscosity of the second partial melt stream (II) of the secondary material,
   forming a difference value from the first measured value of the intrinsic viscosity of the primary material and the second measured value of the intrinsic viscosity of the secondary material,
   increasing or reducing the intrinsic viscosity of the second partial melt stream (II) of the secondary material to the determined first measured value of the intrinsic viscosity of the first partial melt stream (I) of the primary material using a first melt treatment device, on the basis of the difference value formed, or unchangedly maintaining the intrinsic viscosity of the second partial melt stream (II) of the secondary material based on the difference value formed,
   subsequent formation of a common melt stream of the polycondensate melt from the second partial melt stream (II) of the secondary material, in which the quality defined by the intrinsic viscosity of the second partial melt stream (II) has been aligned with the quality of the first partial melt stream (I) or already has said quality, by combining and uniting the second partial melt stream (II) of the secondary material with the first partial melt stream (I) of the primary material.

2. The method according to claim 1, wherein the common melt stream of the polycondensate melt formed of the two partial melt streams (I, II) is mixed using a mixing device.

3. The method according to claim 1, wherein the common melt stream of the polycondensate melt is immediately fed to a shaping unit arranged down-stream of the first melt treatment device.

4. The method according to claim 1, wherein the common melt stream of the polycondensate melt is granulated.

5. The method according to claim 1, wherein, for creating the second partial melt stream (II) of the secondary material, a provided polycondensate material, which has already been processed at least once, is comminuted, possibly cleaned, and in a melting device, the second partial melt stream (II) of the secondary material is formed.

6. The method according to claim 5, wherein, after melting the polycondensate material that has already been processed at least once and before feeding the same into the first melt treatment device a third measured value of the intrinsic viscosity of the second partial melt stream (II) of the secondary material is determined.

7. The method according to claim 1, wherein
   the second partial melt stream (II) of the first melt treatment device is fed to a chamber in a head region distanced from a contact surface, in which chamber a pressure is lower than 20 mbar,
   the second partial melt stream (II) is divided into thin melt threads by using a perforated plate having a plurality of openings,
   that the melt threads pass the chamber in a free fall in the direction toward the contact surface,
   the melt threads are combined into a melt bath in a collection container below the chamber, wherein the collection container is arranged so as to immediately link laterally to the chamber, and a pressure in the collection container is also lower than 20 mbar, the melt constituting the melt bath in the collection container is mixed by a mixing and discharge part oriented in a horizontal position, a height of the melt bath in the collection container is selected at such a height that the mixing and discharge part in the collection container is not entirely covered by the melt, and thus, the surface of the melt is repeatedly torn open and renewed multiple times due to a rotational movement of the mixing and discharge part, and in the course of this, the reduced pressure acts on the melt bath, the melt remains and is kept in motion, thereby continuing polycondensation, which started with the thin melt threads and hence, effecting the polymer chain growth, resulting in a further increase of the intrinsic viscosity, and in that the treated melt is discharged from the collection container as the second, treated partial melt stream (II).

8. The method according to claim 1, wherein the duration of the treatment of the second partial melt stream (II) in the first melt treatment device and/or the pressure present in a chamber of the first melt treatment device and/or the temperature in the chamber of the first melt treatment device are determined based on a determined third measured value of the intrinsic viscosity of the second partial melt stream (II) of the secondary material and the determined first measured value of the intrinsic viscosity of the primary material, and the treatment and therefore the alignment of the intrinsic viscosity is carried out.

9. The method according to claim 1, wherein a third partial melt stream (III) is removed or diverted from the common melt stream of the polycondensate melt, and the third partial melt stream (III) is fed to a further treatment device.

10. The method according to claim 9, wherein the further treatment device is like the first melt treatment device.

11. The method according to claim 1, wherein a target value of the intrinsic viscosity for the polycondensate melt to be produced is defined.

12. The method according to claim 11, wherein the target value of the intrinsic viscosity is stored in a control unit as a reference value.

13. The method according to claim 11, wherein, based on the determined first measured value of the intrinsic viscosity of the first partial melt stream (I) of the primary material, the intrinsic viscosity of the first partial melt stream (I) is aligned with a predetermined target value of the intrinsic viscosity of the polycondensate melt to be produced.

14. The method according to claim 13, wherein the alignment of the intrinsic viscosity of the first partial melt stream (I) of the primary material with the predetermined target value of the intrinsic viscosity of the polycondensate melt is carried out using a second melt treatment device.

15. The method according to claim 1, wherein a molar mass distribution of the first and second partial melt stream (I, II) each have a maximum at a same molar mass.

* * * * *

UNITED STATES PATENT AND TRADEMARK OFFICE
CERTIFICATE OF CORRECTION

| | |
|---|---|
| PATENT NO. | : 11,472,064 B2 |
| APPLICATION NO. | : 17/058517 |
| DATED | : October 18, 2022 |
| INVENTOR(S) | : Thomas Pichler |

It is certified that error appears in the above-identified patent and that said Letters Patent is hereby corrected as shown below:

On the Title Page

Item (54) and in the Specification Column 1, Lines 1-7, please change "METHOD FOR PRODUCING A POLYCONDENSATE MELT FROM A FIRST PARTIAL MELT STREAM AND A SECOND PARTIAL MELT STREAM, WITH INCREASING OR REDUCING AN INTRINSIC VISCOSITY OF THE SECOND PARTIAL MELT" to correctly read:
-- METHOD FOR PRODUCING A POLYCONDENSATE MELT FROM A FIRST PARTIAL MELT STREAM AND A SECOND PARTIAL MELT STREAM, WITH INCREASING OR REDUCING AN INTRINSIC VISCOSITY OF THE SECOND PARTIAL MELT STREAM --

Signed and Sealed this
Twenty-second Day of November, 2022

Katherine Kelly Vidal
*Director of the United States Patent and Trademark Office*